Aug. 6, 1968     P. P. GRAD     3,395,437

METHOD OF MANUFACTURING HYDRODYNAMIC LUBRICATION BEARINGS

Filed May 12, 1965     2 Sheets-Sheet 1

INVENTOR.
PETER P. GRAD
BY Brumbaugh, Free, Graves & Donohue
his ATTORNEYS

Aug. 6, 1968 P. P. GRAD 3,395,437
METHOD OF MANUFACTURING HYDRODYNAMIC LUBRICATION BEARINGS
Filed May 12, 1965 2 Sheets-Sheet 2

INVENTOR.
PETER P. GRAD
BY
Brumbaugh, Free, Graves & Donohue
his ATTORNEYS

United States Patent Office 3,395,437
Patented Aug. 6, 1968

3,395,437
METHOD OF MANUFACTURING HYDRO-
DYNAMIC LUBRICATION BEARINGS
Peter P. Grad, Woodstock, N.Y., assignor to Retron
Manufacturing Company, Inc., Woodstock, N.Y., a
corporation of New York
Filed May 12, 1965, Ser. No. 455,271
10 Claims. (Cl. 29—149.5)

ABSTRACT OF THE DISCLOSURE

A method of making self-lubricating bearings including the steps of forming a skeleton having internal nonporous surfaces conforming to the geometry of the member to be supported by the bearing and compressing a powdered material around the skeleton to form a porous bearing body having porous internal surfaces even with the nonporous surfaces of the formed skeleton.

The present invention relates to the manufacture of bearings, and in particular to an improved method for fabricating self-lubricating bearings.

Self-lubricating bearings have found wide use in machinery of all forms, principally because they provide longer life and increased reliability without constant maintenance. Various types of bearings possessing self-lubricating features are available, one of the more important of which employs a porous material, such as sintered bronze, impregnated with a lubricant.

It has been found that ordinary bearings of the above type perform quite satisfactorily under light and normal load conditions but fail when subjected to heavier loads, because under increased loading the rotating member tends to force the lubricant in the load-carrying region of the bearing surface back into the porous material. The resultant absence of lubricant in the load-carrying zone of the bearing surface causes thermal stresses and ultimate failure of the bearing.

A bearing of this general type, modified to avoid the foregoing difficulty, is disclosed in U.S. Patent No. 3,046,068 to Sternlicht. The bearing shown in the patent is comprised of lubricant-impregnated porous material in load-free regions and substantially non-porous surfaces in the load-carrying area. If the bearing is to be subjected to loads in all radial directions, porous and nonporous surfaces are alternated and diametrically opposed to assure adequate lubrication regardless of the direction of the radial load force. When a load is present, positive pressure is exerted on the load-carrying surface, and negative pressure in the porous load-free surface portion (diametrically opposite the load region) draws the impregnated lubricant out from the porous material.

A method for making self-lubricating bearings of this type is disclosed in Sternlicht's U.S. Patent No. 3,110,085. The process described therein involves machining the surfaces of a block of porous bearing material, during which the pores of the material become closed; masking the areas of surfaces which are to constitute the load-carrying zones; treating the remaining surfaces with an acid solution to open the pores; and impregnating the bearing with lubricant by heating. This method although satisfactory, is expensive because of the separate machining and masking required. Additionally, use of this method for the manufacture of bearing geometries which are not readily finished by machining may be precluded.

Furthermore, it may be desirable to fabricate bearings of the type described in which the load-carrying (non-porous) surfaces are capable of withstanding thermal and mechanical stresses greater than those which can be handled by the machined bearing material alone. In many instances, special alloy load surfaces are required to support continuous heavy bearing loads, while at the same time the self-lubricating feature inherent in porous bearing bodies of softer conventional materials is needed. This combination obviously cannot be realized by the machining and acid treatment of a single bearing material.

The present invention enables such composite self-lubricating bearings to be made in a simple, accurate manner. Briefly, the applicant's improved method comprises the steps of forming a pattern from nonporous material, shaping the pattern into a skeleton or insert having nonporous surfaces for supporting a load in the bearing, and compressing a powdered material around the skeleton to form a bearing body having porous internal surfaces coplanar with the nonporous surfaces of the skeleton. The pattern and the powdered material may be of any suitable materials, and the shape of the skeleton may take any form conforming to the desired geometry of the internal surface of the bearing. In other embodiments, the skeleton or insert may be constructed from tubular stock, or may be otherwise pressed, forged, machined, etc. After the powdered material has been compressed, the bearing structure is sintered by conventional methods. Repressing or sizing the bearing is usually desirable in order to restore any deformation of the structure occurring during the sintering process. Thereafter, the porous bearing body can be impregnated with lubricant by methods well known in the art.

For a better understanding of the invention reference may be made to the following detailed description, taken in conjunction with the drawings in which.

Figure 1:
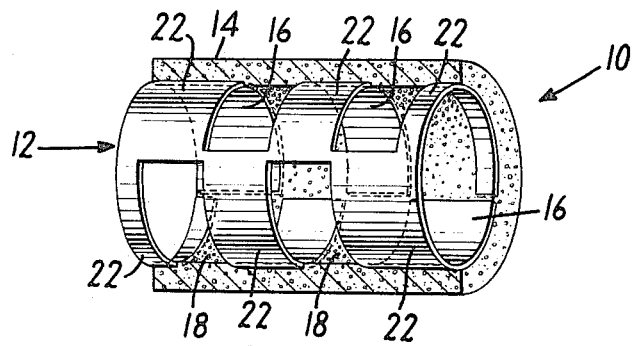
FIGURE 1 is a perspective, partial sectional view of a completed bearing made according to the invention.

Referring now to FIGURE 1, there is shown a bearing 10 manufactured in accordance with the invention. The bearing comprises an insert, or skeleton 12, around which has been compressed powdered material to form a porous bearing body 14. The skeleton 12 may be constructed from any substantially non-porous material, although in many cases it is desirable, for manufacturing purposes, that the bearing body and skeleton be of the same material, e.g., bronze. The internal surfaces 16 of this skeletal structure support the shaft load, and the porous, generally diametrically opposed surfaces 18 allow secretion of the lubricant onto the rotating member (not shown). As previously explained, when the rotating member or shaft is loaded, a negative pressure appears approximately diametrically opposite the load-supporting bearing surface, drawing the impregnated lubricant from the pores.

Figure 2:
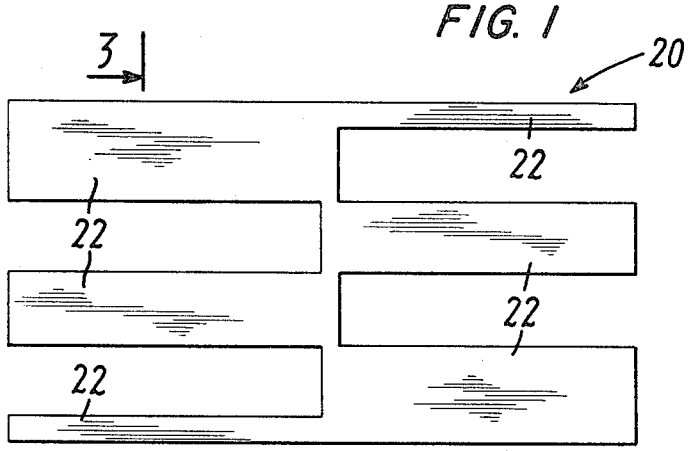
FIGURE 2 is a front elevational view of a pattern suitable for use in the manufacture of cylindrical self-lubricating bearings in accordance with the invention.

The initial stage of the novel bearing manufacturing process is the forming of the skeleton. FIG. 2 illustrates a pattern 20 for a skeleton, which has been stamped from sheet stock. The particular pattern illustrated is exemplary of the configurations suitable for use in cylindrical self-lubricating bearings, and has staggered, oppositely-extending plates 22 which, when the pattern is shaped, will constitute the load-carrying parts of the bearing. The particular design of the stamped-out pattern may be modified to suit the needs of the particular bearing; thus, the pattern may be designed to give extra strength to localized areas under concentrated load or to otherwise aid in effective lubrication. The material used for the skeleton or insert will depend on the severity of the load to be carried, service life of the bearing, etc.; but aside from these additional design considerations, the skeleton pattern or insert is usually of the same material as the porous bearing body. As noted above, the present method is particularly well-suited for the production non-cylindrical and irregular shaped bearings, particular examples of these being the spherical and mushroom geometries. In addition, the invention can be utilized in the production of other bearing structures, such as thrust bearings.

Figure 3:
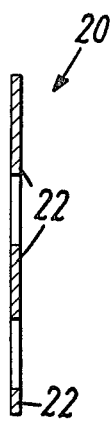
FIGURE 3 is a side elevational view taken generally along the line 3—3 in FIGURE 2.
Figure 4:
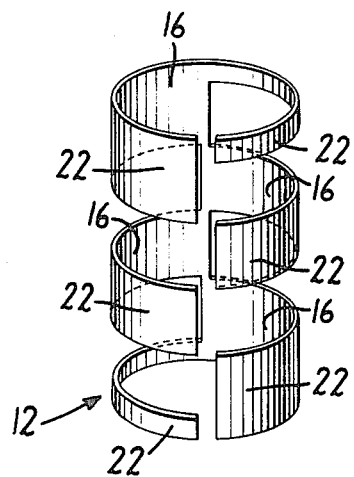
FIGURE 4 is a perspective view of the skeleton shaped from the pattern of FIGURE 2.

The pattern is next shaped to conform to the internal geometry of the bearing. FIGURE 4 shows the resulting skeleton 12 after the pattern of FIGURES 2 and 3 has been rolled for use in a cylindrical bearing by means conventional in the metal fabricating arts. The particular shape of the skeleton used in the present method will, of course, correspond to the configuration of the bearing to be made. Thus, if a spherical bearing is to be fabricated, the skeleton will have spherical geometry so that the internal surfaces of the skeleton conform to the dimensions and geometry of the movable load-transmitting bearing member.

Figure 5:
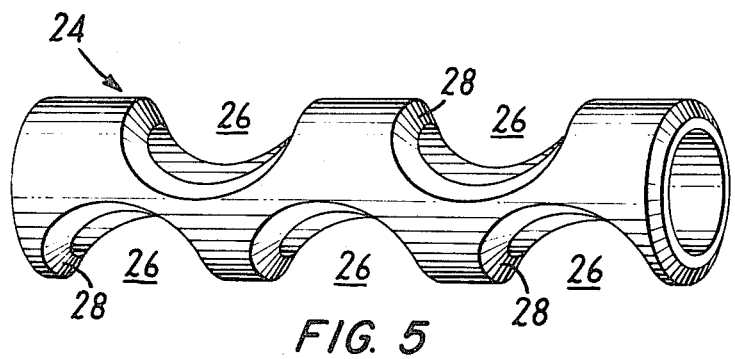
FIGURE 5 is a perspective view of another embodiment of a cylindrical insert suitable for use with the invention.

FIGURE 5 shows another form of skeleton 24 suitable for use in the present method. This insert is fashioned from tubular stock in which circular slots 26 have been milled for accepting the compressed powder material. The beveled surfaces 28, permitting a smooth physical transition from the porous body material to the non-porous structure of the skeleton, are created by rotating the tubular stock about a cylindrical milling tool positioned in orthogonal relation to the tubular stock. The function of the insert is identical with the function of the skeleton 12 formed from the flat pattern 20 as explained above.

Figure 6:
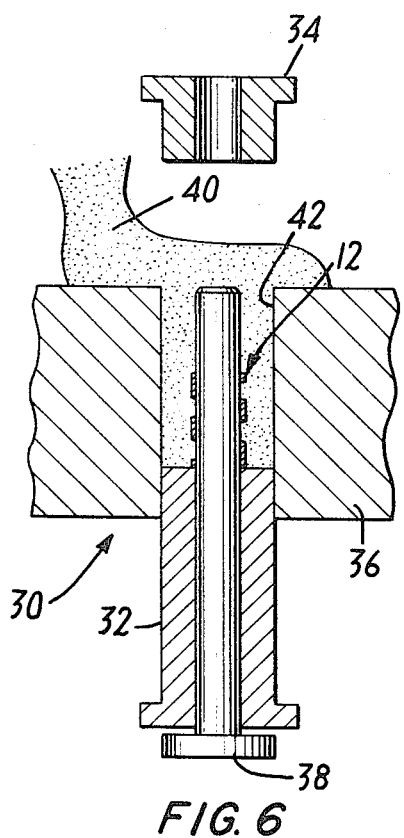
FIGURE 6 is a sectional view of a compression die suitable for use with the invention, showing the position of the die parts and the powdered material prior to compression.
Figure 7:
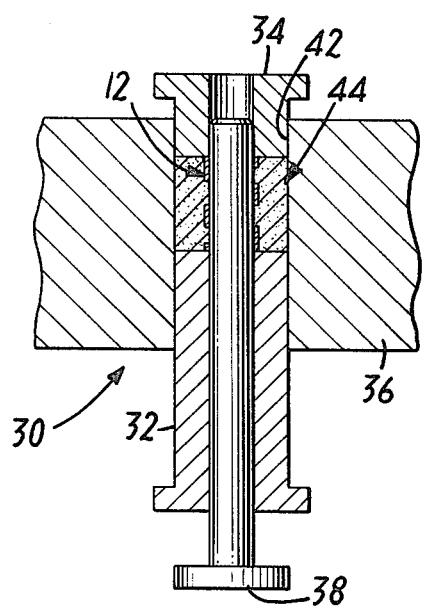
FIGURE 7 is a sectional view of the compression die of FIGURE 5 after compression of the powdered material has taken place.

Referring now to FIGURE 6, the skeleton 12 is shown positioned in a typical die 30 of a conventional, commercially available powder metal compression machine. The components of the illustrative die are the lower punch 32, the upper punch 34, the die shell 36, and the core 38 over which the skeleton 12 of FIGURE 4 has been placed. The powdered material 40 which is to be compressed around the skeleton is added into the die cavity 42, after which the upper and lower punches 34, 32 converge to assume the position shown in FIGURE 7. After compression, the cold pressed bearing 44 is ejected from the die by the further upward movement of the lower punch 32, whereafter the bearing is ready for sintering.

Self-lubricating bearings are usually equipped with a reservoir cavity (not shown) internal of the bearing body 14 from which a supply of lubricant may be drawn. In such case, a core element may be inserted in the die cavity to form the rservoir when the powder material is compressed, or the internal geometry of the die shell 36 may be such as to form the cavity. Alternatively, the reservoir may be machined in the body of the bearing at a later stage in the manufacturing process.

After the powdered material 40 has been cold pressed around the insert or skeleton 12 in the above-explained manner, the compresed structure 44 is placed in a controlled atmosphere for sintering by methods well known in the art. The temperature and duration of the sintering process is dictated by the chemical composition and mechanical properties of the powder.

It is customary, after sintering, to size the bearing in order to correct for any deformation or change in the dimension of the bearing which might have taken place during sintering. Sizing is usually accomplished by repressing the bearing in a die similar to the one illustrated in FIGURES 6 and 7. Thereafter, the porous body 14 of the bearing may be impregnated with lubricant in accordance with known methods.

The present method is also applicable to the manufacture of non-metallic bearings, such as those constructed from Teflon or other suitable polymers. When these non-metallic materials are used with the present method, the powdered polymer is cold pressed, in the manner described above, around a skeleton of the sheeted corresponding polymer or around a metal skeleton, such as those depicted in FIGURES 4 and 5, which has been coated with a film of like material. After cold pressing, the structure is sintered at temperatures of 550° to 800° F. to bind the powdered particles, giving a bearing having the porous and nonporous internal surfaces as in the case of metal bearings. The lower heat-fusible polymers, such as vinyls, polyolefins, polycarbonates, etc., may also be utilized in bearings constructed in accordance with the invention. When these polymers are used, however, the addition of heat-conductive particles to the powder blend is recommended in order to enhance the fusing properties of the powdered material.

The embodiments of the invention described above are representative only. It is understood that many variations and modifications may be made by one skilled in the art without departing from the spirit and scope of the invention. All such variations and modifications, therefore, are intended to be included within the scope of the appended claims.

I claim:

1. A method for making a self-lubricating bearing comprising the steps of forming from a deformable material a skeleton having internal nonporous surfaces conforming to the geometry of a member to be supported by the bearing and compressing a powdered material around the external surfaces of the skeleton to form an integral porous bearing body having porous internal surfaces coplanar with theh nonporous surfaces of the formed skeleton.

2. A method for making a self-lubricating bearing comprising the steps of forming a pattern from nonporous sheet material, shaping the pattern into a skelton having nonporous internal surfaces for supporting a member in the bearing, and compressing a powdered material around the skeleton to form an integral porous bearing body having porous surfaces coplanar with the nonporous surfaces of the formed skeleton.

3. A method for making a self-lubricating cylindrical bearing comprising the steps of forming a pattern from nonporous sheet material, rolling the pattern to form a cylindrical skeleton having internal nonporous surfaces for supporting a shaft in the bearing, and compressing a powdered material around the cylindrical skeleton to form an integral porous bearing body having internal semicylindrical surfaces coplanar with the nonporous surfaces of the formed skeleton.

4. A method for making a self-lubricating cylindrical bearing in accordance with claim 2 wherein the formed pattern has staggered, oppositely extending plates.

5. A method for making a self-lubricating bearing in accordance with claim 1 comprising, in addition, the step of sintering the compressed powdered material.

6. A method for making a self-lubricating bearing in accordance with claim 5 comprising, in addition, the step of impregnating the porous bearing body with lubricant.

7. A method for making a self-lubricating bearing comprising the steps of forming a pattern from sheet metal, shaping the pattern into a skeleton having internal surfaces for supporting a member in the bearing, coating the skeleton with a nonporous polymer to form a polymer film on the internal surfaces of the skeleton, and compressing a powdered polymer around the skeleton to form a porous bearing body having internal porous surfaces coplanar with the internal nonporous surfaces of the skeleton.

8. A method for making a self-lubricating bearing in accordance with claim 7 comprising, in addition, the steps of sintering the pressed bearing at 550° F. to 800° F. and impregnating the bearing body with lubricant.

9. A method for making a self-lubricating bearing in accordance with claim 7, comprising the additional step of adding heat-conductive particles to the powdered polymer prior to compression to aid fusion of the polymer about the skeleton.

10. A method for making a self-lubricating bearing, comprising the steps of forming a skeleton having internal nonporous surfaces defining a volume conforming to the geometry of a member to be supported by the bearing, inserting into the volume defined by the formed skeleton a piece conforming substantially to the shape of the member to be supported and compressing a powdered material around the outside of the skeleton to form an integral porous bearing body having porous internal surfaces substantially even with the non-porous surfaces of the formed skeleton.

References Cited

UNITED STATES PATENTS

| | | | |
|---|---|---|---|
| 2,350,854 | 6/1944 | Whiteley | 29—149.5 |
| 2,689,380 | 9/1954 | Tait | 75—208 |
| 3,110,085 | 11/1963 | Sternlicht | 29—149.5 |

THOMAS H. EAGER, *Primary Examiner.*